No. 659,176. Patented Oct. 2, 1900.
D. D. MILES.
COTTON HARVESTING MACHINE.
(Application filed Mar. 16, 1900.)
(No Model.) 4 Sheets—Sheet 4.

Witnesses. Inventor.

UNITED STATES PATENT OFFICE.

DON D. MILES, OF AURORA, ILLINOIS, ASSIGNOR TO NATHANIEL BOWDITCH, OF SAME PLACE.

COTTON-HARVESTING MACHINE.

SPECIFICATION forming part of Letters Patent No. 659,176, dated October 2, 1900.

Application filed March 16, 1900. Serial No. 8,921. (No model.)

*To all whom it may concern:*

Be it known that I, DON D. MILES, a citizen of the United States, residing at Aurora, in the county of Kane and State of Illinois, have invented a certain new and useful Improvement in Cotton-Harvesting Machines, of which the following is a specification.

My invention relates to cotton-harvesting machines, and has for its object to provide a new and improved machine particularly adapted to gather cotton and similar material.

My invention is illustrated in the accompanying drawings, wherein—

Figure 1:
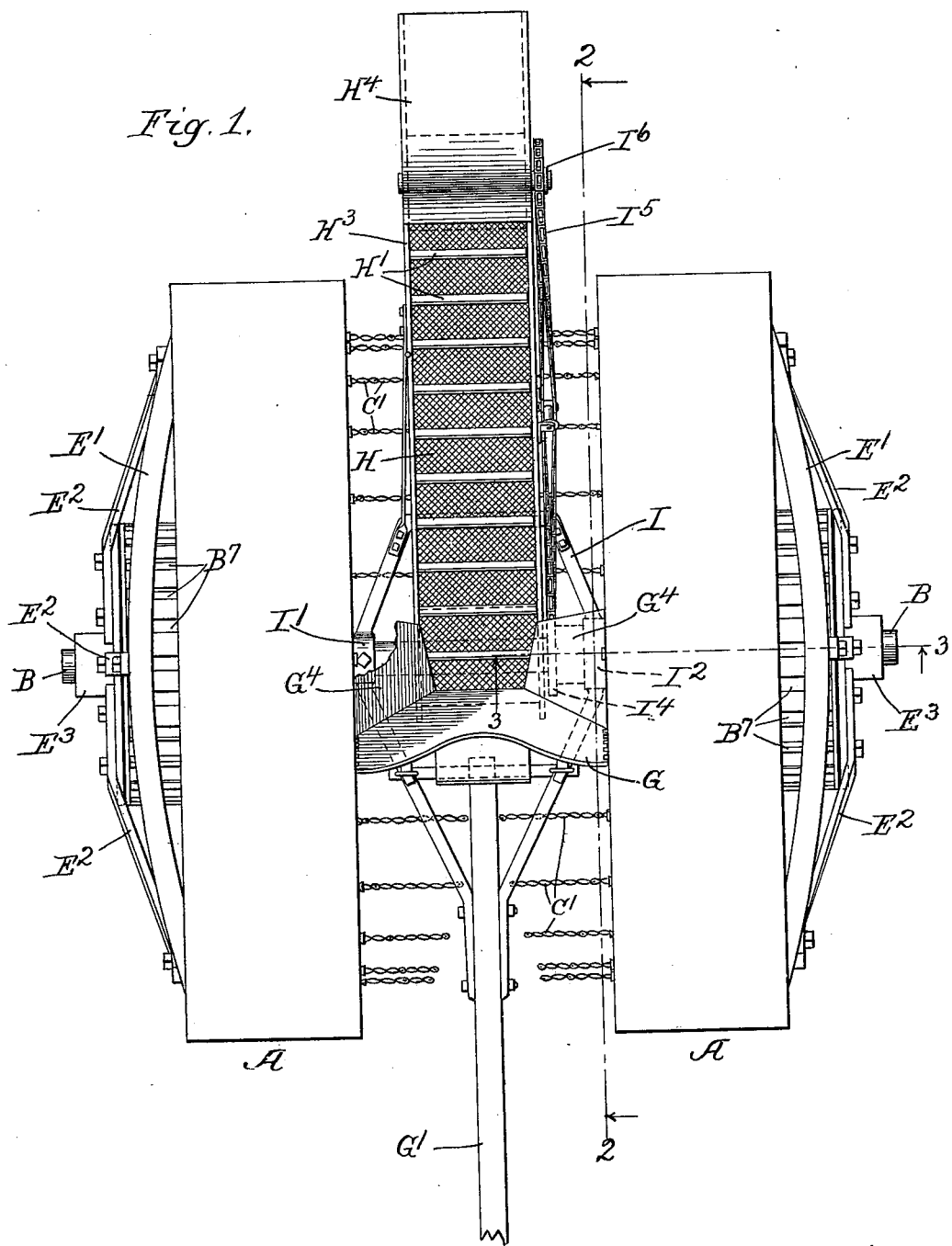
Figure 2:
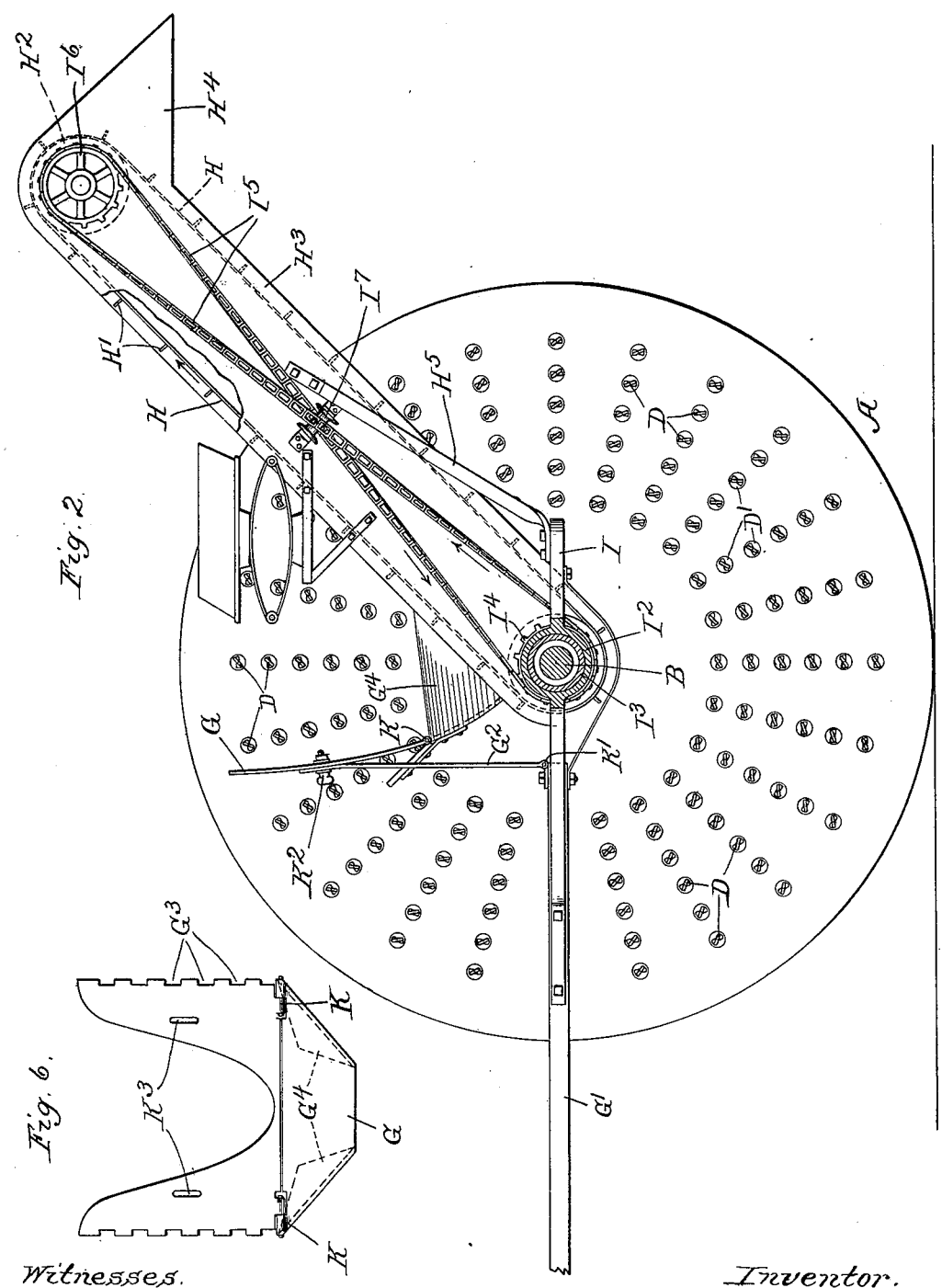
Figure 3:
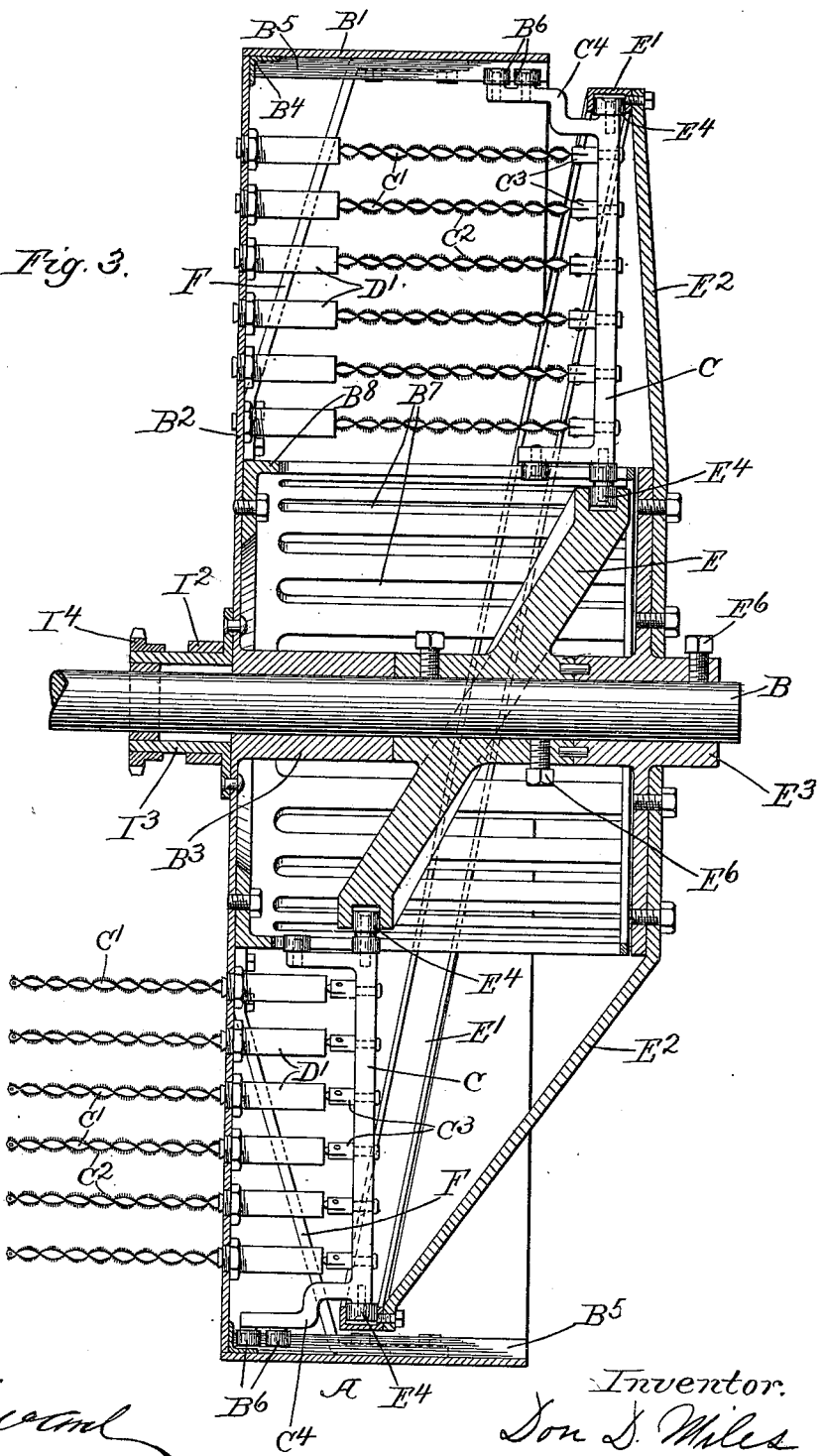
Figure 4:
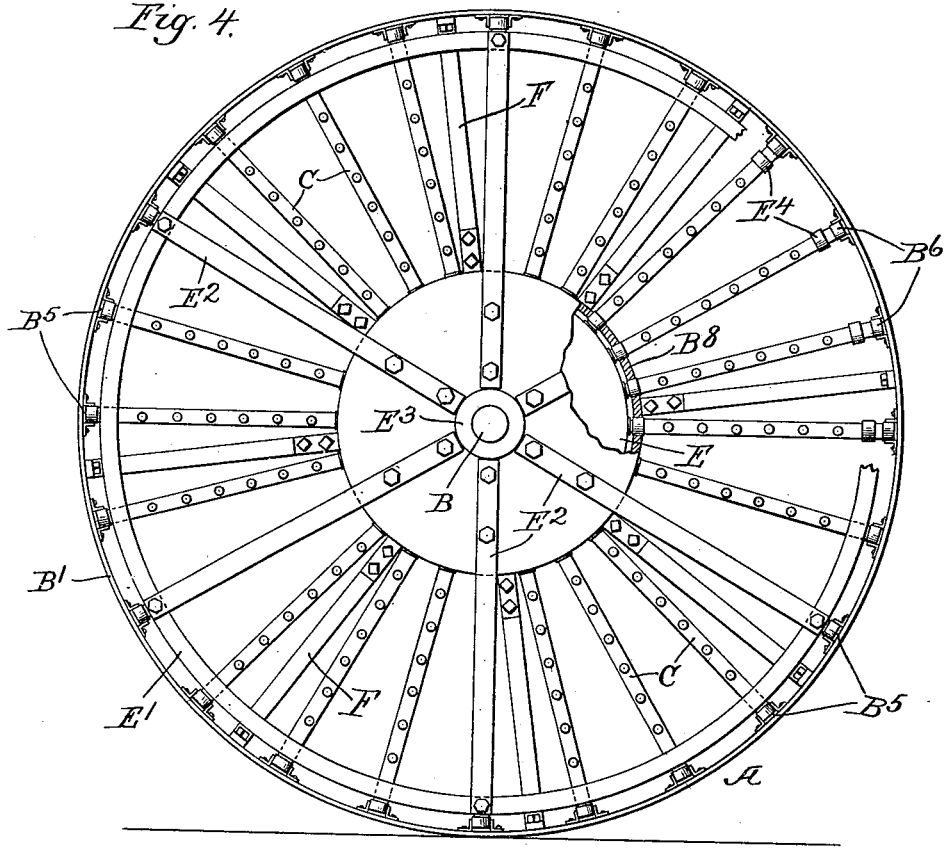
Figure 5:
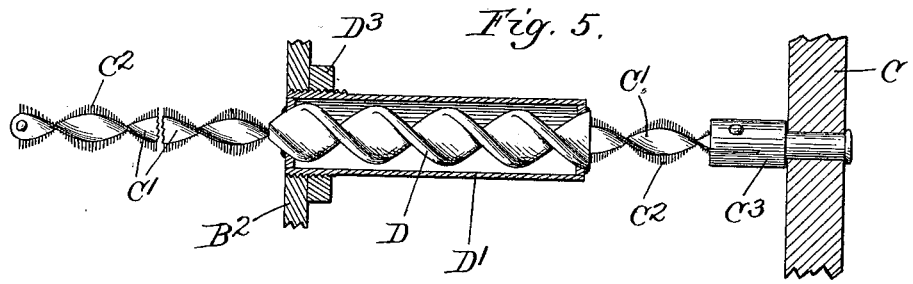

Figure 1 is a plan view of a machine embodying my invention. Fig. 2 is a section on line 2 2, Fig. 1. Fig. 3 is an enlarged section on line 3 3, Fig. 1. Fig. 4 is an exterior view of one of the wheels associated with the harvester with parts broken away. Fig. 5 is an enlarged view in part section showing one of the pickers. Fig. 6 is a view of the comb or removing device for removing the cotton from the wheels.

Like letters refer to like parts throughout the several figures.

In picking cotton by means of machinery many difficulties are encountered due to the peculiarities of the cotton-plant and environments.

One of the objects of my invention is to provide a harvesting-machine which will remove the cotton from the plant in an efficient and satisfactory manner.

Referring now to the drawings, I have shown in Fig. 1 a device consisting of two wheels A A, carrying a mechanism which acts upon the cotton-plants as the wheels are moved forward. These wheels are suitably mounted in proper relation to each other and are preferably provided with means for connecting them with suitable motive power. As illustrated in the drawings, I have shown the device as provided with a tongue, so that it may be drawn along by horses in the usual manner.

Referring now to Fig. 3, I have shown a sectional view of one of the wheels illustrated in Fig. 1. These wheels are preferably made of metal. It is of course evident that the arrangement and construction of the various parts may be greatly modified without in any manner departing from the spirit of my invention, and I have shown for purposes of illustration a simple construction embodying my invention. In this construction the wheels A are mounted upon the axle B. As the two wheels are similar, I have only illustrated one of them in detail. As shown in Fig. 3, the wheel proper consists of the rim $B'$, the web $B^2$, and the hub $B^3$. The web $B^2$ may be of any construction and is preferably a metallic disk and may be connected with the rim by any suitable means—as, for example, the angle-irons $B^4$. Associated with the rim of the wheel are a series of guideways $B^5$, in which work parts associated with the bars C, to which are connected the pickers $C'$. These pickers may be of any desired construction, and, as shown in the drawings, each consists of a spiral-shaped piece movably attached at one end to the bars C and provided at its edges with suitable engaging devices $C^2$, which engage the cotton when the picker comes in contact therewith. It is of course evident that these pickers may be formed in any desired manner, and a simple construction consists in providing two flat pieces, which are riveted together, there being interposed between them haircloth or the like, the ends of which projecting beyond the edges of the strips form the engaging devices $C^2$. The flat pieces are then formed into the shape of a spiral in any desired manner. When this construction is used, the pickers may be attached to the parts $C^3$, which are rotatably mounted in the bars C.

Some suitable means are provided for rotating the pickers $C'$. As herein shown, I provide a series of spiral-shaped guides D, through which the pickers pass, the spiral of the guide causing a rotation of the picker. As herein illustrated, the spiral-shaped guides D are formed of flattened tubes twisted into a spiral shape. These spiral guides are preferably placed in covers or tubes $D'$, which are attached to the web $B^2$ of the wheel. This attachment may be made in any desired manner—as, for example, by providing the tube with a screw-thread, so that it may be screwed into an opening in the web, the parts being held in position by means of a locknut $D^3$. The ends of the spiral guides D preferably project beyond the face of the tubes D and the web B² of the wheel. I have not claimed the spiral guide in my present application, as it is described and claimed in a divisional application divided from this case and filed by me on the 10th day of September, 1900, bearing Serial No. 29,552. Some suitable means are provided for reciprocating the pickers, so that they may be projected beyond the web of the wheel and drawn backward at predetermined times. The bars C are connected with the wheel in any desired manner, so as to rotate therewith, and one or more cams are associated with said bars, so as to move them back and forth as the wheel rotates.

In the construction shown in Fig. 3 the bars are provided with the projecting parts C⁴, which have engaging devices working in the guideways B⁵, there being preferably two friction-rollers B⁶ B⁶, which project into the guideways, as shown. I prefer, also, to provide a second series of guideways B⁷ for the inner ends of the bars C. These guideways may be constructed in any desired manner. As herein shown, I provide a cylindrical part B⁸, having a series of slots which act as guideways, the cylindrical part being connected with the web B² of the wheel. The inner ends of the bars C engage a cam E, which is preferably adjustably connected with the axle B. I also prefer to provide an outer cam E' for the outer end of the bars C. This outer cam is supported upon the axle B in any desired manner—as, for example, by the braces E², attached to the hub E³, connected with the axle B. The cams are preferably provided with suitable guideways, and the bars are preferably provided with friction-rollers E⁴, which work in said guideways. The cams E and E' are inclined and are engaged by the bars C, so that when the wheel is rotated the bars are moved bodily back and forth, so as to reciprocate the pickers. These cams E and E' are fixed to the axle during the operation of the device, but are adjustably connected therewith in any desired manner—as, for example, by the set-screws E⁶. It is often desirable to vary the cycle of operation of the pickers, so as to control or vary the amount of their projection from the wheel when in any given position. This result may be obtained by loosening the set-screws E⁶ and rotating the cam E and the hub E³ about the axle B. It will be seen that this movement of the cams will vary their position with relation to the other parts of the machine, and hence will vary the length of the pickers projecting at any given point. It will thus be seen that the maximum or minimum projection of the pickers from the wheel may be caused to travel, as it were, about the wheel in order to adjust the parts to given conditions. This will be readily seen by referring to Fig. 3. When the cams are in the position shown in said figure, the maximum projection of the pickers occurs when they are near the ground. If now the cams are rotated through an arc of one hundred and eighty degrees, the maximum projection of the pickers would occur when they are farthest from the ground. The maximum projection at any intermediate point may be produced by a corresponding adjustment of the cams. I prefer to provide a series of supports F, which pass between the bars C, as shown, and which are connected at one end to the rim of the wheel and at the other end to the web, so as to support said rim at its outer edge.

Some suitable device is provided for removing the cotton that may adhere to the face of the wheel after the pickers have been drawn inwardly. Any desired device for this purpose may be used. As herein shown, I have provided the removing device or comb G, which is located between the wheels, said comb being supported upon the tongue G' of the machine by means of the supports G². (See Fig. 2.) This comb is provided with a series of notches G³ (see Fig. 6) for the projecting ends of the spiral guides D. This comb or removing device is also preferably provided with the wings G⁴, which guide the material, so that it will be deposited upon the conveying device H, located between the wheels, said wings being attached to the support for the conveying device. I prefer to make the comb or removing device adjustable, so that its position may be varied for adjustment. This adjustment may be necessary, for example, when the cams are rotated so as to vary the point at which the pickers are drawn into the spiral guides. Any desired means may be used for producing this adjustment, and, as herein shown, the upper part of the comb is hinged to the lower part, carrying the wings, by means of the hinges K. The supports G² are hinged at K' and are connected to the upper part of the comb by means of the bolts K², which pass through slots K³. It will be seen that the comb will be held in a given position when the bolts are tightened and when the bolts are loosened the comb may be adjusted. The slots K³ permit this adjustment.

The conveying device may be of any desired construction and preferably consists of an endless belt, with suitable engaging devices H' connected therewith, the belt being mounted upon the rollers H², located at the ends of a suitable supporting-frame H³. This supporting-frame is provided with an overhanging part H⁴, to which sacks or other devices may be attached for receiving the cotton or other material after it has been picked. This conveying or elevating device may be supported in any desired manner. As herein illustrated, the tongue G' is connected with a yoke I, which is supported upon the axle of the machine and which projects backwardly therefrom. Attached to this yoke are suitable braces H⁵, which support the conveying or elevating mechanism. The two branches of this yoke are formed into collars I' I², which surround the axle. The collar I' is preferably rigidly connected with the axle, so that the axle and tongue will always be in the same relative position. The collar I² is not mounted directly upon the axle, but upon a sleeve I³, (see Fig. 3,) connected with the web of one of the wheels, so as to rotate therewith, said sleeve being free to rotate in the collar. Connected with this sleeve is a sprocket-wheel I⁴, (see Fig. 3,) which engages the chain I⁵. A sprocket-wheel I⁶ is attached to the upper roller H² of the elevating device, so that said elevating device may be driven from the wheel. In order to move the elevating or conveying device in the proper direction, the chain I⁵ is crossed, as shown, and a suitable separating-roller I⁷ is provided.

I have shown a series of bars C, each provided with a series of pickers C'; but it is of course evident that the number of bars and pickers may be varied at will. I have shown in detail one particular construction in order to make my invention clear; but I wish it to be understood that this construction may be greatly varied in detail without in any manner affecting the result desired, and hence without departing from the spirit of my invention. I therefore do not limit myself to the construction shown.

The use and operation of my invention are as follows: When it is desired to use the machine to pick cotton, for example, it is moved along the row of cotton-plants, the plants passing between the two wheels. The pickers C' project from the web of the wheels at the lower side, as shown, so as to engage the cotton-plants. When the wheels are rotated, the engagement of the bars C with the cams E and E' causes said bars to be moved back and forth. When the pickers are at the bottom of the wheel and are projected their maximum distance therefrom, so as to be in engagement with the cotton-plant, it will be seen that a further rotation of the wheel moves the bars outwardly, so as to retract the pickers or draw them away from the cotton-plants. This movement of the pickers through the spiral guides produces a rotation of said pickers. It will therefore be seen that the cotton ready to be picked will become entangled with the engaging devices C² on the pickers and be removed from the plant. It will also be seen, on account of the numerous pickers and their disposition, that a series of them engage any given plant, so that all cotton ready to be picked will be taken up. These pickers are flexible, and hence do not injure the plant itself. As the wheels rotate, the pickers at the bottom of the wheels are gradually retracted or drawn inwardly through the spiral guides and the cotton thereon is gradually forced toward the ends of said pickers. The parts are so arranged that when the pickers have moved around so as to be in proximity to the comb or removing device G the outer ends of the pickers pass into the ends of the spiral guides, so that the cotton is released therefrom. The conveying device is so positioned as to receive whatever cotton falls of its own weight from the face of the wheels. The cotton that may adhere to the face of the wheels is engaged by the comb G and is combed or brushed off and conducted to the conveying device. Said cotton is then carried up over the roller H² and passes through an opening in the projection H⁴ into the sack or other device placed to receive it. After the pickers pass the comb G—that is, after the bars C reach the extreme outer parts of the same—the directions of the cams reverse, so as to force the pickers through the spiral guides in the opposite direction and cause them to again project between the wheels. It will be seen that I have here a series of bars having pickers connected therewith, there being provided suitable means for moving said bars bodily in and out, so as to control the position of the pickers, this movement of the bars and pickers causing said pickers to rotate.

In this construction it will be noted that the bars C, to which the pickers are connected, are independent of each other and that the said bars rotate with relation to the device which acts as the agent to give them their reciprocating motion, said device itself being fixed against rotation. It will also be noted that each bar is movably connected to this device, so as to permit its rotation about the same, and that there is provided a suitable guide which always holds the bar in a radial position. Each bar, therefore, as it passes along or around the device which gives it its reciprocating motion moves to or from the web of the wheel without being inclined or tilted or otherwise thrown out of its proper alinement.

I claim—

1. A cotton-harvesting machine, comprising a supporting-wheel, a series of pickers, one or more movable parts to which said pickers are attached, said part or parts mounted in suitable guideways on said supporting-wheel so that they may be moved in a direction substantially parallel to the axis of said supporting-wheel laterally, and means for moving said parts along said guideways, so as to vary the position of the pickers with relation to the material acted upon.

2. A cotton-harvesting machine, comprising a supporting-wheel upon which the machine is supported, one or more movable parts, a series of pickers attached to each of said parts, said parts movably mounted on the supporting-wheel and supported at their ends, and means for moving said parts bodily along their supports, so as to vary the position of the pickers with relation to the material acted upon.

3. A cotton-harvesting machine, comprising a series of movable parts, a series of pickers attached to each of said parts, means for moving said parts bodily so as to vary the position of the pickers with relation to the material acted upon, and a spiral guide associated with each picker, through which the part of the picker which engages the cotton extends.

4. A cotton-harvesting machine, comprising a series of movable parts, a series of pickers rotatably attached to each movable part, means for moving said movable parts bodily so as to reciprocate the pickers, and a spiral guide engaging the part of each picker which engages the cotton so as to rotate the same when the picker is reciprocated.

5. A cotton-harvesting machine, comprising a supporting-wheel upon which the machine is supported, a series of movable parts mounted upon said wheel, each having one or more pickers connected thereto, a cam device associated with said movable parts and adapted to vary their position when the wheel is rotated.

6. A wheel for cotton-harvesting machines, comprising a series of parts rotating with and movable with relation to the web of said wheel, one or more pickers connected with each of said movable parts and rotatably attached thereto, a spiral guide associated with each picker, and means for moving said movable parts in a direction substantially parallel to the axis of the wheel.

7. A wheel for cotton-harvesting machines, comprising a series of parts movable in a direction substantially parallel to the axis of said wheel, one or more pickers connected with each of said movable parts and rotatably attached thereto, a spiral guide associated with each picker, a cam associated with said movable parts, so that when the cam and parts are moved relatively said parts will be moved in a direction substantially parallel to the axis of the wheel and the cotton on the pickers brought into contact with the face of the wheel so that the pickers are withdrawn therefrom.

8. A supporting-wheel for cotton-harvesting machines, comprising a series of parts rotating with and movable in a direction substantially parallel to the axis of said wheel, one or more pickers rotatably connected with each of said parts, two cams engaging said parts at different points, said cams producing a bodily movement of said parts when the wheel is rotated.

9. A wheel for cotton-harvesting machines, comprising a series of parts movable in a direction substantially parallel to the axis of said wheel, one or more pickers rotatably connected with each of said parts, a spiral guide engaging each of said pickers, two cams between which said movable parts are located, said cams engaging the movable parts so as to move them in a direction substantially parallel to the axis of said wheel when the wheel is rotated and bring the cotton on the pickers into contact with the face of the wheel so that the pickers are withdrawn therefrom.

10. A wheel for cotton-harvesting machines, comprising a series of parts movable in a direction substantially parallel to the axis of said wheel, two cams inclined with relation to the axis of said wheel and engaging said parts at different points, one or more pickers mounted upon each of said parts.

11. A wheel for cotton-harvesting machines, comprising a series of parts movable in a direction substantially parallel to the axis of said wheel, two cams inclined with relation to the axis of said wheel and engaging said parts at different points, one or more pickers rotatably mounted upon each of said parts, and a spiral guide engaging each of said pickers.

12. A wheel for cotton-harvesting machines, comprising a series of movable parts, a series of guideways at the rim of the wheel and near the hub thereof extending substantially parallel to the axis of the wheel, projecting parts associated with said movable parts and engaging said guideways, one or more pickers connected with said movable parts, and means for moving said parts in the guideways of the wheel.

13. A wheel for cotton-harvesting machines, comprising a series of parts movable in a direction substantially parallel to the axis of said wheel, two sets of guideways associated with said wheel and between which said parts are interposed, two fixed cams engaging each of said movable parts at different points, and one or more pickers connected with each of said movable parts.

14. A wheel for cotton-harvesting machines, comprising a web and a projecting rim, a series of guideways associated with the rim of said wheel, a second series of guideways separated from the rim by an intervening space, a series of parts movable in a direction substantially parallel to the axis of said wheel interposed between the two sets of guideways and provided with parts coöperating with said guideways, and means for moving said parts in a direction substantially parallel to the axis of said wheel when the wheel is rotated.

15. A cotton-harvesting machine, comprising a wheel provided with a web and a projecting rim, an axle upon which said wheel is rotatably mounted, two cams inclined with relation to the axis of said wheel and separated by an intervening space, said cams attached to said axle, a series of bars between said cams and provided with parts which coöperate therewith, one or more spiral pickers rotatably mounted upon each of said bars, a spiral guide associated with each of said pickers, said guides connected with the web of the wheel.

16. A cotton-harvesting machine, comprising a wheel provided with a projecting rim, a series of guideways associated with said rim, a cylindrical part smaller in diameter than the wheel and connected therewith, said part provided with a series of slots which correspond to the guideways in the rim, a series of parts movable in a direction substantially parallel to the axis of said wheel provided with engaging devices which coöperate with the guideways in the rim and the slots in the cylindrical part, and means for moving said parts in a direction substantially parallel to the axis of said wheel when the wheel is rotated.

17. A cotton-harvesting machine, comprising two supporting-wheels in proximity to each other, a series of spiral guides, a series of pickers adapted to be projected through said spiral guides from the opposed sides of the wheels so as to engage the cotton-plant, and a comb or removing device interposed between the wheels and adapted, when the wheels are rotated, to engage the cotton that may adhere to the wheels and remove it therefrom.

18. A cotton-harvesting machine, comprising two wheels in proximity to each other, a series of spiral guides, a series of pickers adapted to be projected through said spiral guides from the opposed sides of the wheels so as to engage the cotton-plant, a conveying device for handling the cotton after it is picked, and a comb associated with said conveying device and adapted, when the wheels are rotated, to engage the cotton adhering thereto and remove it therefrom.

19. A cotton-harvesting machine, comprising two wheels rotatably mounted upon a suitable axle and provided with cotton-picking devices projected through spiral guides, a conveying device for engaging the cotton after it is picked and moving it to a predetermined point, a supporting device mounted upon said axle for supporting said conveying device, a sleeve rigidly connected with one of said wheels and provided with a sprocket-wheel, a collar on said supporting device, through which said sleeve loosely passes, and a flexible belt connected with said sprocket-wheel and with the mechanism of the conveying device, substantially as described.

20. A cotton-harvesting machine, comprising two wheels movably mounted upon a suitable axle, a series of bars movable in a direction substantially parallel to the axis of said wheels associated with each wheel, one or more spiral pickers rotatably mounted upon each of said bars, a spiral guide associated with each of said pickers, the opposed faces of the two wheels being provided with a series of openings through which the pickers are projected into the space between the wheels, one or more cams associated with each wheel and adapted to engage said bars so as to move them and vary the length of the pickers projecting from the opposed faces of the wheels, a comb or removing device between the wheels adapted to engage the cotton adhering to the wheels and a conveying device associated with said comb, which receives the cotton and carries it to a predetermined point.

21. A cotton-harvesting machine, comprising two wheels in proximity to each other, a series of guides connected thereto, a series of pickers adapted to be projected through said guides from opposed sides of the wheels, so as to engage the cotton-plants, a conveying device for conveying the picked cotton to a given point so that it may be removed from the machine, an adjustable comb associated with said conveying device and a movable part adapted to be varied in position with relation thereto, said comb adapted, when the wheels are rotated, to engage the cotton adhering to said wheels and remove it therefrom.

22. A wheel for cotton-harvesting machines, comprising a wheel proper, and a series of guides associated therewith, a series of cotton-pickers adapted to be reciprocated in said guides, a series of bars, each having one or more pickers connected therewith, a part fixed against rotation in a plane at an angle to the plane of the wheel proper, said bars engaging said part, but movably connected therewith so that they may be rotated with relation thereto.

Signed at Chicago, county of Cook, State of Illinois, this 24th day of November, 1899.

DON D. MILES.

Witnesses:
JOHN C. McCORD,
LEO W. BULWER.